(12) United States Patent
Soberano et al.

(10) Patent No.: US 12,416,143 B2
(45) Date of Patent: Sep. 16, 2025

(54) FLUSH VALVE APPARATUS

(71) Applicant: AS America, Inc., Piscataway, NJ (US)

(72) Inventors: Eric B. Soberano, Barnegat, NJ (US); Walter Pitsch, Washington, NJ (US)

(73) Assignee: AS America, Inc., Piscataway, NJ (US)

( * ) Notice: Subject to any disclaimer, the term of this patent is extended or adjusted under 35 U.S.C. 154(b) by 243 days.

(21) Appl. No.: 18/031,305

(22) PCT Filed: Oct. 11, 2021

(86) PCT No.: PCT/US2021/054374
§ 371 (c)(1),
(2) Date: Apr. 11, 2023

(87) PCT Pub. No.: WO2022/081456
PCT Pub. Date: Apr. 21, 2022

(65) Prior Publication Data
US 2023/0374764 A1    Nov. 23, 2023

Related U.S. Application Data

(60) Provisional application No. 63/090,322, filed on Oct. 12, 2020.

(51) Int. Cl.
*E03D 5/10*        (2006.01)

(52) U.S. Cl.
CPC .................................. *E03D 5/105* (2013.01)

(58) Field of Classification Search
None
See application file for complete search history.

(56) References Cited

U.S. PATENT DOCUMENTS

| | | | |
|---|---|---|---|
| 5,259,073 A * | 11/1993 | Tsutsui | E03D 5/10 4/300 |
| 5,469,586 A * | 11/1995 | Tsutsui | F16K 31/007 4/DIG. 3 |
| 7,735,513 B2 | 6/2010 | Bush | |
| 8,069,877 B2 | 12/2011 | Jacobs et al. | |
| 8,215,327 B2 | 7/2012 | Bush | |
| 8,261,770 B2 | 9/2012 | Bush | |

(Continued)

FOREIGN PATENT DOCUMENTS

EP    3561186 A1    10/2019

OTHER PUBLICATIONS

PCT/US2021/054374 International Search Report, 2 pages, dated Jan. 19, 2022.

*Primary Examiner* — Janie M Loeppke
(74) *Attorney, Agent, or Firm* — Anna-Lisa L. Gallo; Tyler A. Stevenson (57) ABSTRACT

A flush valve assembly for sanitaryware, comprising a flush valve having a valve inlet configured to be fluidly coupled to a water source inlet pipe and a valve outlet configured to be fluidly coupled to a flush water outlet pipe; a solenoid valve; a presence sensor; a controller; and a flow sensor and/or a pressure sensor, wherein the controller is configured to open the solenoid valve to initiate a flush cycle, the flow sensor and/or pressure sensor is configured to detect a volume of flush water delivered and to communicate the delivered flush water volume to the controller, and the controller is configured to close the solenoid valve when a pre-set delivered flush water volume has been reached.

14 Claims, 4 Drawing Sheets

(56) References Cited

U.S. PATENT DOCUMENTS

| | | | |
|---|---|---|---|
| 8,387,653 B2 | 3/2013 | Bush | |
| 8,490,646 B2 | 7/2013 | Bush | |
| 9,493,936 B2 * | 11/2016 | Bush | G05D 16/2095 |
| 10,378,676 B2 | 8/2019 | Bush et al. | |
| 2004/0227117 A1 | 11/2004 | Marcichow et al. | |
| 2004/0232370 A1 | 11/2004 | Parsons et al. | |
| 2010/0252759 A1 | 10/2010 | Guler et al. | |
| 2017/0073954 A1 * | 3/2017 | Lor | E03C 1/01 |
| 2018/0291594 A1 | 10/2018 | Hammond et al. | |
| 2022/0333363 A1 * | 10/2022 | Cummings | E03D 13/00 |

* cited by examiner

FLUSH VALVE APPARATUS

The present invention relates to a flush valve apparatus for sanitaryware, for example a toilet or a urinal.

BACKGROUND

Modern commercial sanitaryware often include a flushometer flush valve apparatus, instead of a water tank of most residential-type toilets. A flushometer requires a large water supply line to operate properly. A flushometer uses the water pressure from a source water supply line to provide a high-pressure flush.

Automatic flush valves may include a diaphragm or piston separating an upper chamber (or back-pressure chamber) from a lower chamber and a main water supply. When a flush valve is in a steady state (not cycling through a flush), water pressure in an upper chamber is in equilibrium with water pressure in a lower chamber, and presses down on a diaphragm or piston in a closed position. To initiate a flush cycle in an automatic flush valve, a solenoid valve is opened, allowing water to be released from an upper chamber through the main flush valve. This results in a drop in water pressure in an upper chamber, resulting in a diaphragm or piston to lift, and creating an opening to a main water supply, allowing water from a main water supply to flow through the main valve to a sanitaryware bowl to flush the bowl. To end a flush cycle, the solenoid valve is closed, an upper chamber is refilled with water through a small hole in a diaphragm or piston, and the diaphragm or piston returns to a closed rest position, shutting off the water supply to the sanitaryware.

A solenoid open time is related to an amount of delivered flush water. A solenoid open time is fixed, and does not account for variations in source water pressure or flow rate. Accordingly, a drop in source water pressure or flow rate may result in an insufficient flush; an increase in source water pressure flow rate may result in wasting fresh water. Further, high flush volume may result in some erratic behavior, including noise, vibrations, and the like.

An improved flush valve apparatus is desired in which such undesired effects are eliminated.

SUMMARY

A flush valve assembly, comprising a flush valve having a valve inlet configured to be fluidly coupled to a water source inlet pipe and a valve outlet configured to be fluidly coupled to a flush water outlet pipe; a solenoid valve; a presence sensor; a controller; and a flow sensor and/or a pressure sensor, wherein the solenoid valve, the presence sensor, the controller, and the flow sensor and/or the pressure sensor are in electrical communication, the controller is configured to open the solenoid valve to initiate a flush cycle, the flow sensor and/or pressure sensor is configured to detect a volume of flush water entering the flush valve inlet and/or exiting the flush valve outlet and to communicate the flush water volume to the controller, the controller is configured to close the solenoid valve when a pre-set flush water volume has been reached.

Also disclosed is a flush valve apparatus comprising a flush valve assembly as described herein, and comprising a water source inlet pipe coupled to the flush valve inlet and a flush water outlet pipe coupled to the flush valve outlet, and wherein a flow sensor and/or a pressure sensor is positioned upstream of the flush valve inlet and/or downstream of the flush valve outlet.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1:
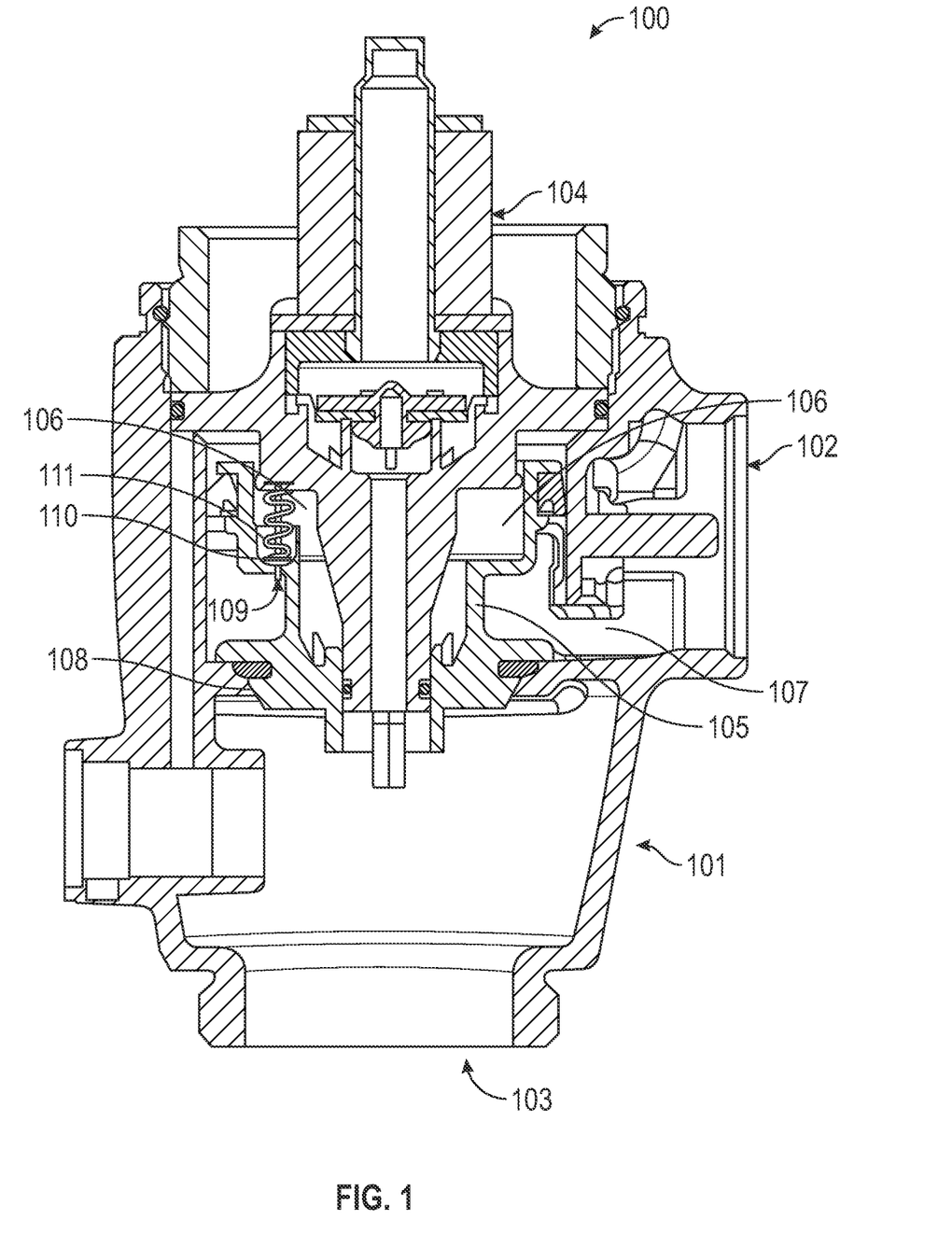
FIG. 1 shows a cross-section view of an automatic flush valve, according to an embodiment.

FIG. 1 provides a cross-section view of automatic flush valve assembly 100, according to an embodiment. Flush valve assembly 100 comprises flush valve body 101 comprising inlet 102 and outlet 103. Inlet 102 will be in fluid communication with a pressurized water source. Outlet 103 is configured to deliver flush water to a sanitaryware fixture, for instance a toilet bowl or urinal. Shown in the cross-section view are solenoid assembly 104, piston 105, upper chamber 106, and lower chamber 107. Upon detection of a person leaving a sanitaryware fixture via a presence sensor, solenoid assembly 104 is activated and water is discharged from upper chamber 106 to outlet 103. As pressure drops in upper chamber 106, piston 105 lifts off valve seat 108, allowing pressurized source water to flow through inlet 102 to outlet 103 and onto a fixture. As water flows into upper chamber via bypass orifice 109, pressure again equilibrates between upper chamber 106 and lower chamber 107 and piston 105 re-seats to stop pressurized water flow and end a flush cycle. Bypass orifice 109 may contain pin 110, which moves freely in orifice 109. Spring 111 may aid in returning piston 105 to a closed position on valve seat 108.

Figure 2A:
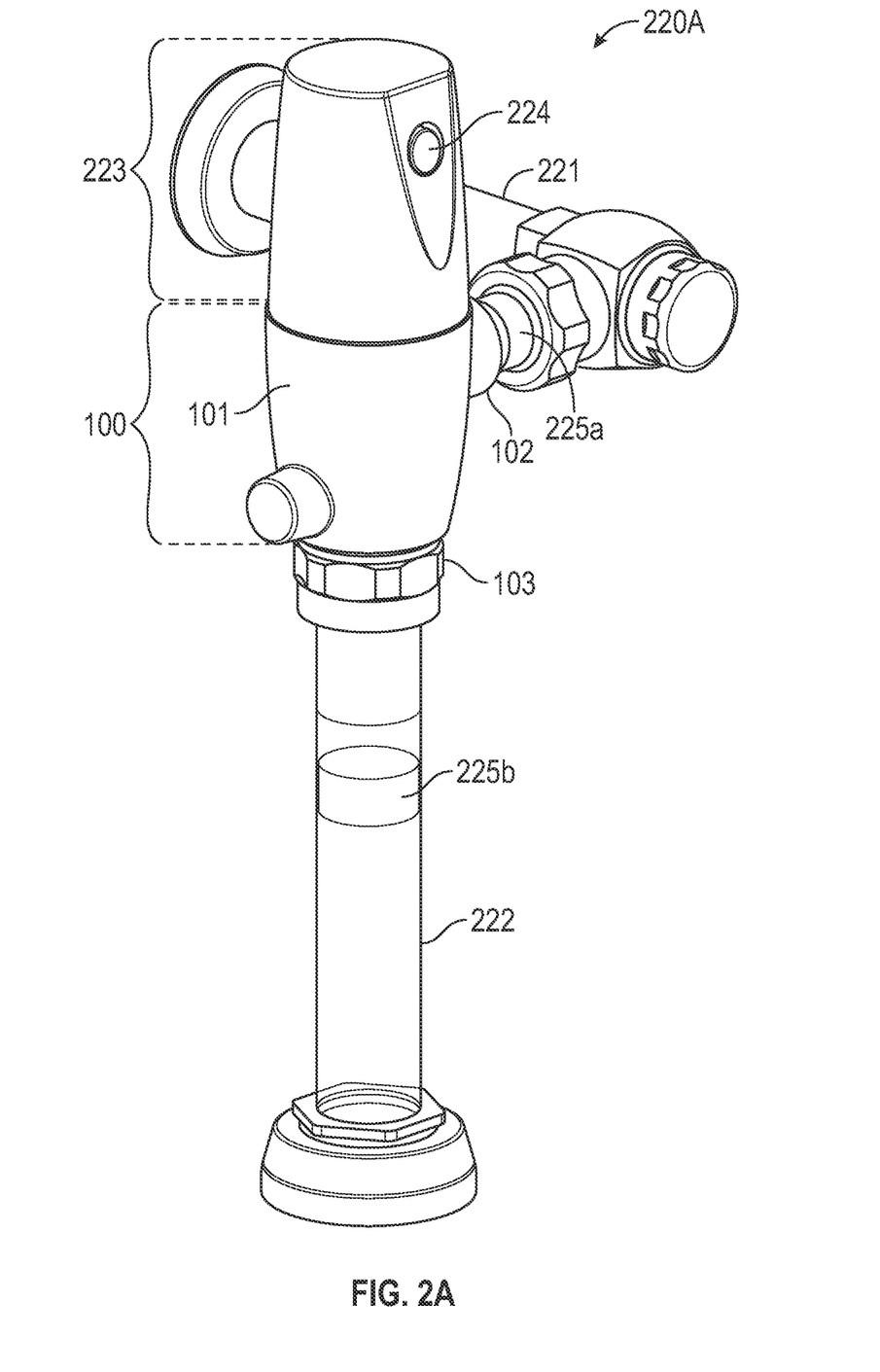
FIG. 2A, FIG. 2B, and FIG. 2C depict flush valve apparatuses, according to some embodiments.

FIG. 2A shows automatic flush valve apparatus 220A, according to an embodiment. Apparatus 220A comprises flush valve assembly 100 comprising valve body 101, valve inlet 102 and valve outlet 103 positioned in a lower housing. Apparatus 220A also comprises source water inlet pipe 221 and flush water outlet pipe 222. Valve upper housing 223 comprises presence sensor 224. Flush valve apparatus 220A comprises upstream external flow sensor 225a in a position between source water pipe 221 and inlet 102. In another embodiment, flow sensor 225a may be positioned in-line. In other embodiments, sensor 225a may be a pressure sensor. Apparatus 220A comprises downstream in-line flow sensor 225b positioned in outlet pipe 222. In another embodiment, flow sensor 225b may be external. In other embodiments, sensor 225b may be a pressure sensor.

Figure 2B:
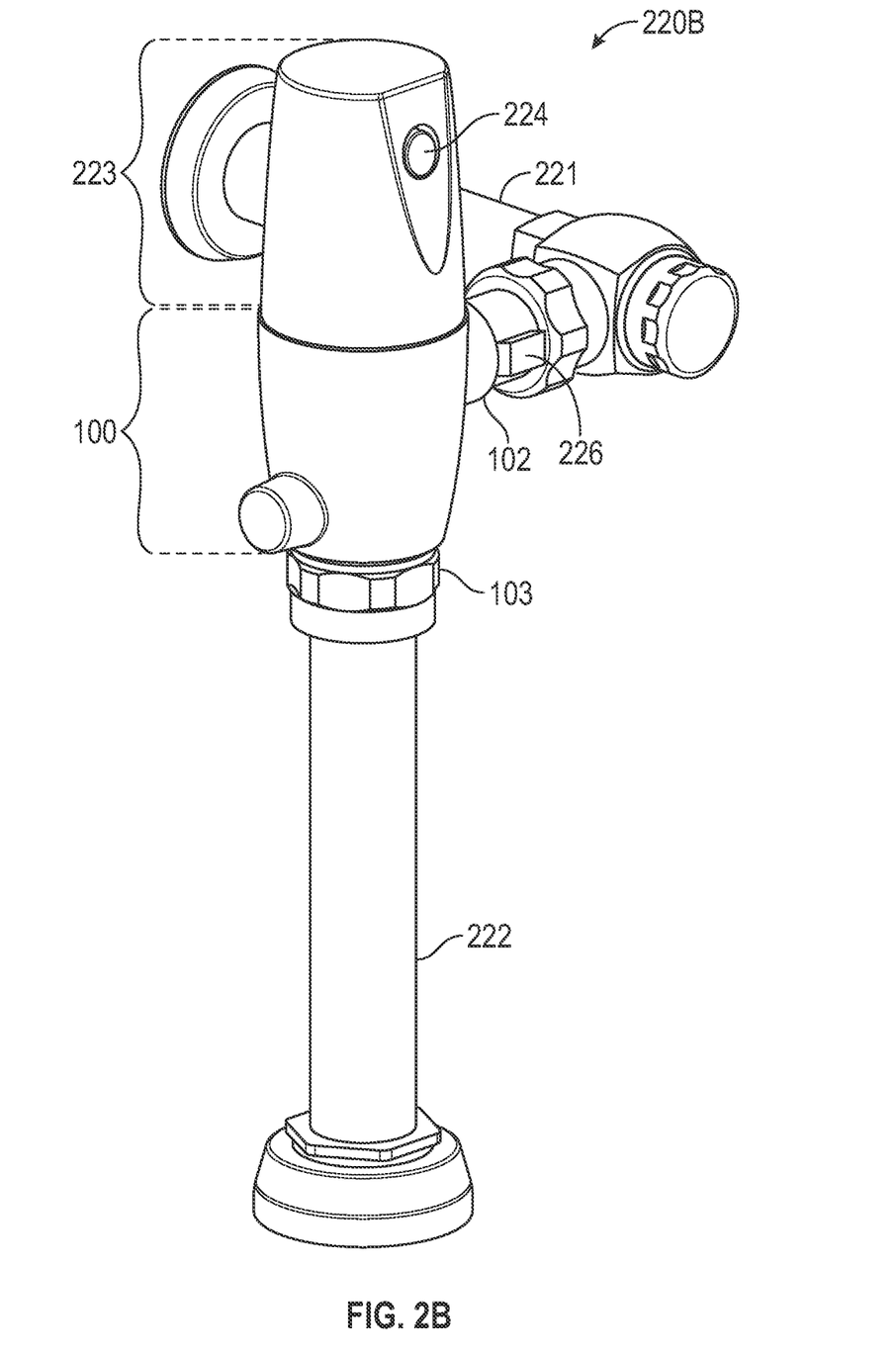
Figure 2C:
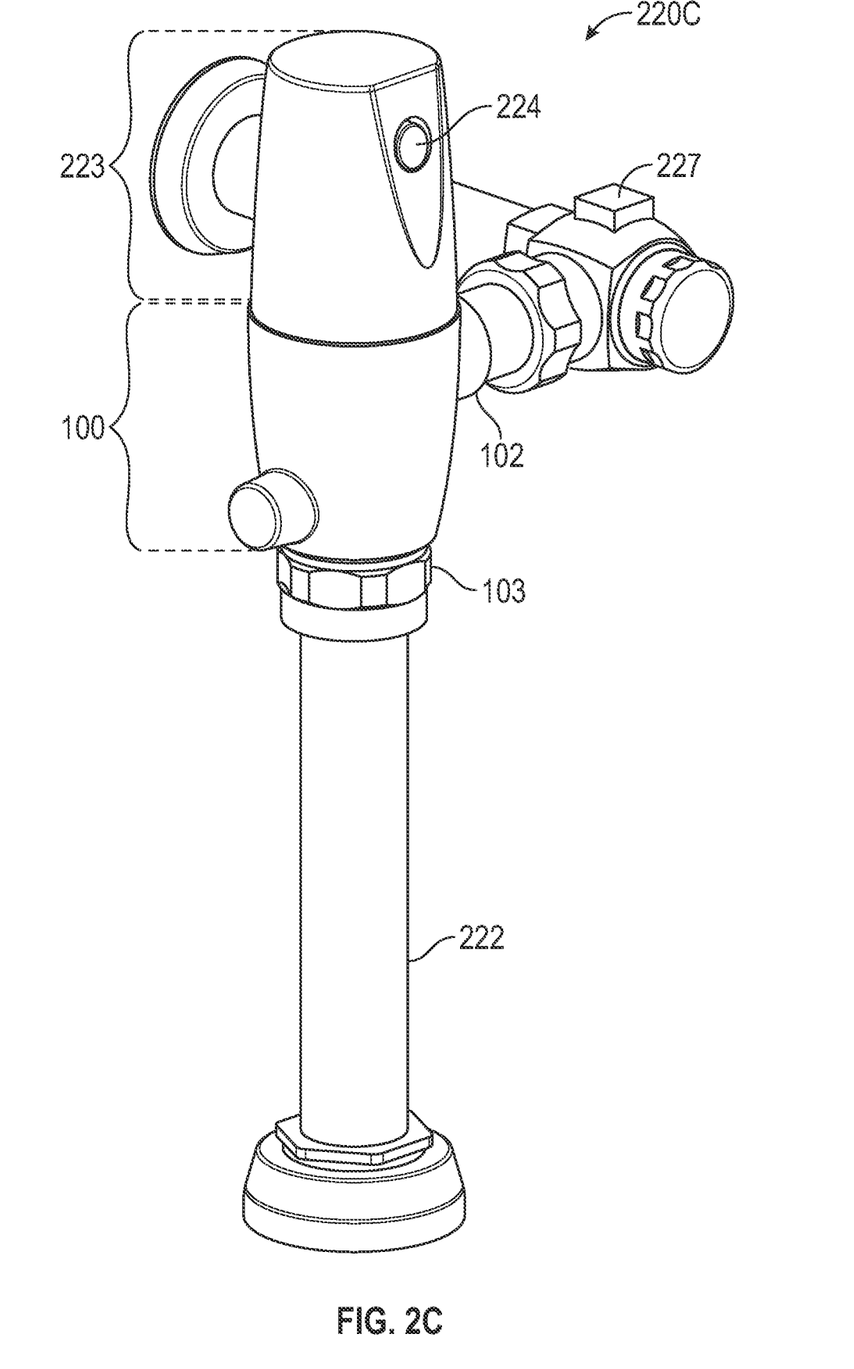

FIG. 2B shows automatic flush valve apparatus 220B, according to another embodiment. Flush valve apparatus 220B contains external pressure sensor 226 positioned between source water inlet pipe 221 and valve inlet 102, upstream of flush valve inlet 102. In another embodiment, sensor 226 may be in-line. In other embodiments, sensor 226 may be a flow sensor. FIG. 2C shows automatic flush valve apparatus 220C, according to a further embodiment. Apparatus 220C contains external ultrasonic sensor 227 positioned upstream of valve inlet 102. In another embodiment, sensor 227 may be in-line. In another embodiment, sensor 227 may be a pressure sensor.

In some embodiments, a flush valve assembly may comprise an upper chamber, a lower chamber, a main valve seat, and a piston. Between flush cycles, water in an upper chamber and lower chamber are in equilibrium and a piston is seated on the main valve seat in a closed rest position. Upon initiation of a flush cycle, a controller (microcontroller or printed circuit board) directs a solenoid valve to open, causing water to flow from the upper chamber through the flush valve outlet. As pressure drops in the upper chamber, the piston is lifted from the main valve seat, allowing pressurized source water to flow through the flush valve to a sanitaryware fixture.

When the solenoid valve is closed, the upper chamber and lower chamber may then re-equilibrate as water passes through a small bypass hole in the piston from the lower chamber to the upper chamber. As water pressure in the upper and lower chambers again reach equilibrium, a piston re-seats on the main valve seat to close the flush valve and end a flush cycle. A small bypass hole or orifice may comprise a pin which serves to keep the hole clean and free of debris.

This process may essentially be repeated with a flexible diaphragm in place of a piston. A solenoid valve open time is typically determined by a set time. If source water pressure varies, a solenoid valve open time may be either too long or too short. If source water pressure increases, too much fresh water will be used for a flush cycle. If source water pressure decreases, too little water will be employed in a flush cycle, resulting in an insufficient flush.

In some embodiments, a flush valve assembly may be part of an exposed flush valve apparatus which may comprise an upper housing and a lower housing. An upper housing may comprise, be coupled to, or contain features including a presence sensor, a presence sensor lens, a manual override actuator, or a controller. An upper and lower housing may comprise a substantially cylinder-like shape. In some embodiments, an upper housing may comprise a battery. An exposed flush valve assembly lower housing may contain a solenoid valve. In some embodiments, an exposed flush valve assembly upper and/or lower housing may comprise a metal, for example zinc or stainless steel.

In some embodiments, a flush valve assembly may be part of a concealed flush valve apparatus comprising a plate configured to be positioned on a bathroom wall near (e.g. above) a sanitaryware fixture. A plate may conceal and/or be associated with or coupled to a flush valve assembly comprising a solenoid valve, water inlet, water outlet, presence sensor, presence sensor lens, flow sensor and/or pressure sensor, manual override actuator, controller, or battery. In some embodiments, a plate may comprise zinc or stainless steel.

In some embodiments, a flush valve assembly may be powered by a battery. In other embodiments, a flush valve assembly may be powered by a building electric supply or both. A battery may be positioned in an interior space of a housing.

In some embodiments, a flush valve assembly may comprise a solenoid valve. A flush valve assembly may comprise a water inlet in fluid communication with a water source. A flush valve assembly may comprise a water outlet fluidly coupled to a sanitaryware fixture. In some embodiments, a flush valve assembly may comprise an angle stop.

A flush valve assembly may comprise a presence sensor associated with a presence sensor lens. In some embodiments, a presence sensor may be an infrared (IR) sensor. A flush valve assembly may comprise a manual override actuator, which may be a push-button, lever, switch, and the like.

A flush valve assembly comprises a controller (microcontroller). A controller may be in electrical (wired) communication with a flow and/or pressure sensor, a presence sensor, and a solenoid valve.

An exposed flush valve assembly upper housing and a concealed flush valve assembly plate may comprise an aperture comprising a presence sensor lens, wherein the presence sensor is positioned behind the lens. A presence sensor lens may comprise a thermoplastic polymer. An exposed flush valve assembly upper housing and a concealed flush valve assembly plate may comprise a manual override actuator. In some embodiments, an exposed flush valve assembly upper housing and concealed flush valve assembly plate may comprise an LED indicator light. An LED indicator light may indicate battery life, status of sanitaryware, etc.

In some embodiments, a flow sensor may comprise a propeller and operate via the Hall Effect. In other embodiments, a flow sensor may comprise a wheel or turbine and operate via the Hall Effect. In further embodiments, a flow sensor may be an ultrasonic sensor having emitter(s)/receiver(s) to measure fluid flow. In other embodiments, a flow sensor may comprise a flow switch. A flow sensor or pressure sensor is in electrical communication with a controller. A controller may be configured to determine a volume of water flow into and/or out of a flush valve.

In some embodiments, one or more flow sensors and/or pressure sensors are configured to detect a volume of flush water entering a flush valve inlet and/or exiting a flush valve outlet. The one or more flow sensors and/or pressure sensors are configured to communicate water volume data to a controller. A controller is configured to instruct a solenoid valve to open to enter a flush cycle to initiate a flush, and to instruct the solenoid valve to close to end the flush cycle. The controller is configured to instruct the solenoid valve to close when a pre-set flush water volume has been reached.

A controller may be programmed with a pre-set flush water volume. In some embodiments, upon a controller determining that a pre-set flush water volume has been reached during a flush cycle, from information received from a flow sensor and/or pressure sensor, the controller will send a signal to the solenoid valve to close to stop water flow from an upper chamber. Flush water will continue to flow from a main valve inlet through a main valve and through a main valve outlet, until upper chamber pressure exceeds the lower chamber pressure and a piston or diaphragm is re-seated to close the main valve. Accordingly, an optimal pre-set water volume may be determined to be somewhat less than a desired total flush volume, for example less than about 1.28 gallons per flush (gpf) for a toilet or less than about 0.5 gpf for a urinal.

In some embodiments, flow sensors or pressure sensors may be in-line or "wetted", positioned within a water line. Alternatively, flow sensors or pressure sensors may be positioned on or near a water pipe, referred to herein as "external to" or "non-intrusive" or "clamped-on". In some embodiments, an external sensor may be coupled to a water pipe via a clamp, a housing, adhesive, or other method.

In some embodiments, a flush valve assembly may comprise both a flow sensor and a pressure sensor. In some embodiments, a flush valve apparatus may comprise a flow sensor positioned upstream of a flush valve inlet. In other embodiments, a flush valve assembly may comprise a flow sensor positioned downstream of a flush valve outlet. In certain embodiments, a flush valve assembly may comprise a flow sensor positioned upstream of a flush valve inlet, and downstream of a flush assembly outlet. In certain embodiments, a flush valve apparatus may comprise a flow sensor and a pressure sensor.

In embodiments employing two or more flow sensors and/or pressure sensors, a controller may be configured to receive information from both sensors, and to prioritize information from one over the other, or to average information from both. In some embodiments, information received from a first sensor may have to be confirmed with information received from a second sensor prior before a controller sends instructions to close a solenoid valve to end a flush cycle.

For example, information may be received by a controller from a first upstream flow or pressure sensor indicating a pre-set water volume of somewhat less than a desired flush cycle volume (a volume less than e.g. 1.28 gallons, or less than 0.5 gal, etc.) has flowed into the flush valve. The controller is configured to then send instructions to a solenoid valve to close to end a flush cycle. A controller may be configured to receive information from a second downstream flow or pressure sensor that a full desired water volume (e.g. 1.28 gallons, 0.5 gallons, etc.) has been delivered to a toilet or urinal (or not). A controller may be configured to adjust a pre-set flush water volume if the delivered water is less than or greater than a desired flush water volume.

In a case of a single downstream flow or pressure sensor, a controller may be configured to instruct a solenoid to close when a pre-set flush water volume of somewhat less than a full desired flush water volume has been delivered. A controller may be configured to also receive information regarding the total flush water volume delivered. A controller may be configured to adjust the pre-set flush water volume if the delivered water volume is less than or greater than a desired flush water volume.

In an embodiment, also disclosed is a flush valve assembly or a flush valve apparatus, wherein a controller is configured to instruct a solenoid to close to end a flush cycle upon receiving information from a flow or pressure sensor that a pre-set water flush volume has been reached, wherein the pre-set water flush volume is less than a desired total water flush volume.

In an embodiment, a controller is configured to instruct a solenoid to close to end a flush cycle, and to receive information from a flow or pressure sensor regarding the total flush water volume delivered. In an embodiment, a controller is configured to adjust a pre-set water flush volume if the total flush water volume delivered is less than or greater than a desired total water flush volume.

Following are some non-limiting embodiments of the disclosure.

In a first embodiment, disclosed is a flush valve assembly, comprising a flush valve having a valve inlet configured to be fluidly coupled to a water source inlet pipe and a valve outlet configured to be fluidly coupled to a flush water outlet pipe; a solenoid valve; a presence sensor; a controller; and a flow sensor and/or a pressure sensor, wherein the solenoid valve, the presence sensor, the controller, and the flow sensor and/or the pressure sensor are in electrical communication, the controller is configured to open the solenoid valve to initiate a flush cycle, the flow sensor and/or pressure sensor is configured to detect a volume of flush water entering the flush valve inlet and/or exiting the flush valve outlet and to communicate the flush water volume to the controller, the controller is configured to close the solenoid valve when a pre-set flush water volume has been reached.

In a second embodiment, disclosed is a flush valve assembly according to embodiment 1, comprising a flow sensor and a pressure sensor. In a third embodiment, disclosed is a flush valve assembly according to embodiments 1 or 2, comprising an in-line flow sensor and/or an in-line pressure sensor. In a fourth embodiment, disclosed is a flush valve assembly according to any of the preceding embodiments, comprising an external flow sensor and/or an external pressure sensor.

In a fifth embodiment, disclosed is a flush valve assembly according to any of the preceding embodiments, wherein the flow sensor comprises a wheel, propeller, or turbine. In a sixth embodiment, disclosed is a flush valve assembly according to any of embodiments 1 to 4, wherein the flow sensor comprises an ultrasonic sensor.

In a seventh embodiment, disclosed is a flush valve assembly according to any of the preceding embodiments, wherein the flush valve comprises a piston, wherein during a flush cycle the piston lifts off a valve seat to open the flush valve to allow pressurized source water to pass through the flush valve outlet. In an eighth embodiment, disclosed is a flush valve assembly according to any of embodiments 1 to 6, wherein the flush valve comprises a diaphragm, wherein during a flush cycle the diaphragm lifts off a valve seat to open the flush valve to allow pressurized source water to pass through the flush valve outlet.

In a ninth embodiment, disclosed is a flush valve assembly according to any of the preceding embodiments, wherein the presence sensor is configured to communicate when a user has left a detection area to the controller, whereupon the controller opens the solenoid valve.

In a tenth embodiment, disclosed is a flush valve apparatus comprising the flush valve assembly according to any of embodiments 1 to 9, comprising a water source inlet pipe coupled to the flush valve inlet and a flush water outlet pipe coupled to the flush valve outlet, and wherein the flow sensor and/or the pressure sensor are positioned upstream of the flush valve inlet and/or downstream of the flush valve outlet.

In an eleventh embodiment, disclosed is a flush valve apparatus according to embodiment 10, comprising a flow sensor positioned upstream of the flush valve inlet and/or downstream of the flush valve outlet. In a twelfth embodiment, disclosed is a flush valve apparatus according to embodiments 10 or 11, comprising a flow sensor positioned upstream of the flush valve inlet and downstream of the flush valve outlet. In a thirteenth embodiment, disclosed is a flush valve apparatus according to embodiments 10 to 12, comprising an in-line flow sensor positioned upstream of the flush valve inlet and downstream of the flush valve outlet.

In a fourteenth embodiment, disclosed is a flush valve apparatus according to any of embodiments 10 to 13, comprising a pressure sensor positioned upstream of the flush valve inlet and/or downstream of the flush valve outlet. In a fifteenth embodiment, disclosed is a flush valve apparatus according to any of embodiments 10 to 14, comprising a flow sensor and a pressure sensor.

Following is another set of non-limiting embodiments.

In a first embodiment, disclosed is a flush valve assembly, comprising a flush valve having a valve inlet configured to be fluidly coupled to a water source inlet pipe and a valve outlet configured to be fluidly coupled to a flush water outlet pipe; a solenoid valve; a presence sensor; a controller; and one or more flow sensors and/or pressure sensors, wherein the solenoid valve, the presence sensor, the controller, and the one or more flow sensors and/or pressure sensors are in electrical communication, the controller is configured to open the solenoid valve to initiate a flush cycle, the flow sensor and/or pressure sensor is configured to detect a volume of flush water entering the flush valve inlet and/or exiting the flush valve outlet and to communicate the flush water volume to the controller, and the controller is configured to close the solenoid valve when a pre-set flush water volume has been reached.

In a second embodiment, disclosed is a flush valve assembly according to embodiment 1, comprising an in-line flow sensor and/or an in-line pressure sensor. In a third embodiment, disclosed is a flush valve assembly according to embodiment 1, comprising an external flow sensor and/or an external pressure sensor.

In a fourth embodiment, disclosed is a flush valve apparatus comprising the flush valve assembly according to embodiment 1, and further comprising a water source inlet pipe coupled to the flush valve inlet and a flush water outlet pipe coupled to the flush valve outlet, wherein a flow sensor and/or a pressure sensor are positioned upstream of the flush valve inlet and/or downstream of the flush valve outlet.

In a fifth embodiment, disclosed is a flush valve apparatus according to embodiment 4, wherein the flow sensor and/or pressure sensor positioned upstream of the flush valve inlet is in-line or external, positioned in or on the water source inlet pipe, respectively, and wherein the flow sensor and/or pressure sensor positioned downstream of the flush valve outlet is in-line or external, positioned in or on the flush water outlet pipe, respectively.

In a sixth embodiment, disclosed is a flush valve apparatus according to embodiment 5, comprising a flow sensor and a pressure sensor. In a seventh embodiment, disclosed is a flush valve apparatus according to embodiment 5, comprising a first flow sensor and a second flow sensor. In an eighth embodiment, disclosed is a flush valve apparatus according to embodiment 5, comprising a first pressure sensor and a second pressure sensor.

In a ninth embodiment, disclosed is a flush valve apparatus according to embodiment 6, wherein one of the flow sensor and the pressure sensor is in-line and the other is external, and wherein one of the flow sensor and the pressure sensor is positioned upstream of the flush valve inlet and the other is positioned downstream of the flush valve outlet. In a tenth embodiment, disclosed is a flush valve apparatus according to embodiment 6, wherein the flow sensor and the pressure sensor are in-line, and wherein one of the flow sensor and the pressure sensor is positioned upstream of the flush valve inlet and the other is positioned downstream of the flush valve outlet. In an eleventh embodiment, disclosed is a flush valve apparatus according to embodiment 6, wherein the flow sensor and the pressure sensor are external, and wherein one of the flow sensor and the pressure sensor is positioned upstream of the flush valve inlet and the other is positioned downstream of the flush valve outlet.

In a twelfth embodiment, disclosed is a flush valve apparatus according to embodiment 7, wherein one of the first flow sensor and the second flow sensor is in-line and the other is external, and wherein one of the first flow sensor and the second flow sensor is positioned upstream of the flush valve inlet and the other is positioned downstream of the flush valve outlet. In a thirteenth embodiment, disclosed is a flush valve apparatus according to embodiment 7, wherein the first flow sensor and the second flow sensor are in-line, and wherein one of the first flow sensor and the second flow sensor is positioned upstream of the flush valve inlet and the other is positioned downstream of the flush valve outlet. In a fourteenth embodiment, disclosed is a flush valve apparatus according to embodiment 7, wherein the first flow sensor and the second flow sensor are external, and wherein one of the first flow sensor and the second flow sensor is positioned upstream of the flush valve inlet and the other is positioned downstream of the flush valve outlet.

In a fifteenth embodiment, disclosed is a flush valve apparatus according to embodiment 8, wherein one of the first pressure sensor and the second pressure sensor is in-line and the other is external, and wherein one of the first flow sensor and the second flow sensor is positioned upstream of the flush valve inlet and the other is positioned downstream of the flush valve outlet. In a sixteenth embodiment, disclosed is a flush valve apparatus according to embodiment 8, wherein the first pressure sensor and the second pressure sensor are in-line, and wherein one of the first pressure sensor and the second pressure sensor is positioned upstream of the flush valve inlet and the other is positioned downstream of the flush valve outlet. In a seventeenth embodiment, disclosed is a flush valve apparatus according to embodiment 8, wherein the first pressure sensor and the second pressure sensor are external, and wherein one of the first pressure sensor and the second pressure sensor is positioned upstream of the flush valve inlet and the other is positioned downstream of the flush valve outlet.

In an eighteenth embodiment, disclosed is a flush valve assembly according to embodiment 1, comprising a flow sensor, wherein the flow sensor comprises a wheel, propeller, or turbine. In a nineteenth embodiment, disclosed is a flush valve assembly according to embodiment 1, comprising a flow sensor, wherein the flow sensor comprises an ultrasonic sensor.

In a twentieth embodiment, disclosed is a flush valve assembly according to any of embodiments 1 to 18, wherein the flush valve comprises a piston or a diaphragm, wherein during a flush cycle the piston or the diaphragm lifts off a valve seat to open the flush valve to allow pressurized source water to pass through the flush valve outlet.

The term "adjacent" may mean "near" or "close-by" or "next to".

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "flow communication" means for example configured for liquid or gas flow there through and may be synonymous with "fluidly coupled" or "fluid communication". The terms "upstream" and "downstream" indicate a direction of gas or fluid flow, that is, gas or fluid will flow from upstream to downstream.

The term "electrical communication" may be synonymous with "electrically coupled" or "electrically connected" and may mean an element may send or receive electricity or electronic signals to another element, either via a wired connection or a wireless connection. The term "associated with" may mean "coupled", i.e. "electrically coupled".

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A flush valve assembly, comprising
   a flush valve having a valve inlet configured to be fluidly coupled to a pressurized water source and a valve outlet configured to be fluidly coupled to a toilet or to a urinal;
   a solenoid valve;
   a presence sensor;
   a controller; and
   a flow sensor or a pressure sensor,
   wherein
   the solenoid valve, the presence sensor, the controller, and the sensor or pressure sensor are in electrical communication,
   the flush valve comprises a piston,
   the flush valve is configured to deliver a first pre-set volume of flush water to the toilet and a second pre-set volume of flush water to the urinal during a flush cycle,
   the controller is configured to open the solenoid valve to initiate the flush cycle, causing the piston to lift off a valve seat to open the flush valve to allow the pressurized water to pass through the valve outlet to the toilet or the urinal,
   the controller is programmed with the first pre-set volume of flush water or the second pre-set volume of flush water to be delivered to the toilet or to the urinal during the flush cycle, respectively,
   the flow sensor or pressure sensor is configured to detect a volume of flush water entering the flush valve inlet and/or exiting the flush valve outlet and to communicate the flush water volume to the controller, and
   the controller is configured to close the solenoid valve when the first pre-set flush water volume or the second pre-set flush water volume has been reached.

2. The flush valve assembly according to claim 1, comprising the pressure sensor.

3. The flush valve assembly according to claim 2, wherein the pressure sensor is positioned in-line.

4. The flush valve assembly according to claim 2, wherein the pressure sensor is positioned external to a water line.

5. The flush valve assembly according to claim 1, comprising the flow sensor.

6. The flush valve assembly according to claim 5, wherein the flow sensor is positioned in-line.

7. The flush valve assembly according to claim 5, wherein the flow sensor is positioned external to a water line.

8. The flush valve assembly according to claim 5, wherein the flow sensor comprises a wheel, propeller, or turbine.

9. The flush valve assembly according to claim 5, wherein the flow sensor comprises an ultrasonic sensor positioned external to a water line.

10. The flush valve assembly according to claim 1, comprising the pressure sensor and the flow sensor.

11. The flush valve assembly according to claim 1, comprising a first pressure sensor and a second pressure sensor.

12. The flush valve assembly according to claim 1, comprising a first flow sensor and a second flow sensor.

13. The flush valve assembly according to claim 1, wherein the flow sensor or pressure sensor are positioned upstream of the flush valve inlet.

14. The flush valve assembly according to claim 1, wherein the flow sensor or pressure sensor are positioned downstream of the flush valve outlet.

* * * * *